United States Patent Office 3,303,233
Patented Feb. 7, 1967

3,303,233
BIODEGRADABLE SURFACTANTS
Edwin K. Jones, Kenilworth, Ill., assignor to Universal Oil Products Company, Des Plaines, Ill., a corporation of Delaware
No Drawing. Filed June 10, 1964, Ser. No. 374,190
6 Claims. (Cl. 260—677)

This application is a continuation-in-part of my copending application Serial No. 280,070, filed May 13, 1963, which in turn is a continuation-in-part of my application, Serial No. 79,576, filed December 30, 1960, both applications now abandoned.

This invention relates to a process for the production of detergents and other surface active agents containing a hydrophobic alkylaryl radical which is subjected to bacterial attack during sewage treatment. More specifically, this invention relates to surfactant products and to the process for producing the same, said products consisting of substantially straight chain alkyl-substituted aromatic compounds formed by separating from certain naphtha fractions of petroleum a straight chain paraffin in which the number of carbon atoms in the paraffin corresponds to the number of carbon atoms in the alkyl group of the desired alkyl substituted aromatic compound, dehydrogenating the recovered paraffin to form the corresponding monoolefin, condensing the straight chain olefin with an aromatic compound to form an alkylaryl intermediate and thereafter converting the alkylate to said surfactant by a process which introduces a hydrophilic radical into the alkylate, for example, via sulfonation. The resulting product which contains both a hydrophobic and a hydrophilic group is a detergent product subject to bacterial attack and degradation in a subsequent sewage treatment process after the detergent has been used in a laundering or other cleaning operating and discharged into such sewage treatment facilities.

One of the major problems prevalent in centers of population throughout the world is the disposal of sewage and the inactivation of detergents dissolved in the sewage in even small quantities. Such disposal problem is especially vexacious in the case of those detergents having an alkylaryl structure as the nuclear portion of the detergent molecule. These detergents produce stable foams in hard or soft waters in such large quantities that the foam clogs sewage treatment facilities and often appears in sufficient concentration in such facilities to destroy the bacteria necessary for sufficient biological action for proper sewage treatment. One of the principal offenders of this type of detergent is the alkylaryl sulfonates, which, unlike the fatty acid soaps, do not precipitate when mixed with hard water containing calcium or magnesium ions in solution. Since these compounds are only partly biodegradable, the detergent persists in solution and is carried through the sewage treatment plant in substantially unchanged or still-active form. Having an abiding tendency to foam, especially when mixed with aerating devices and stirrers, large quantities of foam are discharged from the sewage digestion plant into rivers and streams where the continuing presence of the detergent is marked by large billows of foam on the surface. Other offenders of this type of detergent are the polyoxyalkylated alkylphenols and the polyoxyalkylated alkylanilines. These same synthetic detergents also interfere with the anaerobic process of degradation of other materials, such as grease, and thus compound further the pollution caused by sewage plant effluents containing such detergents. These dilute detergent solutions often enter subsurface water currents which feed into underground water strata from which many cities draw their water supplies and the alkylaryl-based detergents find their way into the water supplies drawn from water-taps in homes, factories, hospitals and schools. Occasionally these detergents turn up in sufficient quantities in tap water to make drinking water foam as it pours from the tap.

Although the effluents from cities' sewage plants may be clear and appear non-contaminated, many tons of synthetic detergents which have resisted the sewage treatment and which have survived the bacterial action normally present in open surface streams cause the formation of large masses of foam at the bottom of weirs and dams in water streams fed by sewage plant effluents from cities whose population utilizes large quantities of synthetic detergents. During 1959 over 1.5 billion pounds of surface active agents (on the unbuilt basis, exclusive of the inorganic salts added to commercial detergents) were sold in the United States. Of this quantity of synthetic detergents entering the sewage treatment facilities throughout the United States, it is estimated than 530 million pounds were of the bacterially incompletely degradable (hard), synthetic alkylbenzene sodium sulfonate type.

An adequate supply of pure water, like clean air, is essential to the further growth and development of cities and the maintenance of human health standards. It has now been found that alkylaryl-based detergents, such as the sodium sulfonate derivatives of these alkylaryl hydrocarbons, phenols and amines, are more readily degradable by sewage bacteria if the long chain alkyl substituent on the phenyl nucleus is of a simple, straight-chain configuration than if it is of a more complex branched chain structure. As an example, detergent compounds containing an alkylaryl hydrophobic group in which the alkyl side chain has a structure such as the following:

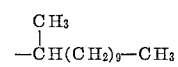

are more likely to be bacterially digested than detergents of the same chemical composition but in which the alkyl radical is a more highly branched chain, isomeric structure, such as:

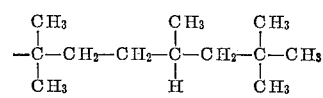

Thus, alkylaryl based detergents in which the alkyl portion of the molecule has a relatively straight chain structure, such as the alkyl group illustrated in the first of the two structures above, produce biologically soft detergents which undergo bacterial degradation in the treatment of sewage and do not appear as active detergents in the effluents of such sewage treatment plants.

It is an object of this invention to produce a detergent containing an alkylaryl group in which the alkyl side chain attached to the aromatic nucleus has a relatively straight chain structure capable of biological degradation during the treatment of sewage containing such detergents. Another object of this invention is to provide an alkylating agent which when condensed with an alkylatable aromatic compound produces an alkylate having a structure suitable for the production of biologically soft detergents therefrom without sacrifice in the yield of product, effectiveness of the final detergent product or its water-solubility.

In one of its embodiments this invention concerns a process for the production of a surface active agent containing (1) a hydrophobic hydrocarbon radical consisting of a long chain, alkyl-substituted phenyl group in which the long chain alkyl substituent contains from about 9 to about 15 carbon atoms and (2) a hydrophilic, water-solubilizing radical selected from the group consisting of sulfo, sulfonate and polyoxyalkylene containing from 4 to about 30 oxyalkylene units per radical containing from 2 to 3 carbon atoms per alkylene unit, said process comprising the following steps in sequence: separating a straight chain paraffin from a paraffinic naphtha boiling in the range of from about 125° to about 250° C. and containing a straight chain paraffin in admixture with branched chain isomers thereof, converting said straight chain paraffin hydrocarbon to an olefin derivative of straight chain structure, alkylating an aromatic compound selected from the group consisting of benzene, toluene, xylene, ethylbenzene, diethylbenzene, methylethylbenzene, phenol and nitrobenzene with said olefin derivative at condensation reaction conditions to form the mono-alkylate of said aromatic compound, and converting said mono-alkylate to said biologically soft detergent product.

Alkylaryl intermediate is a necessarily important precursor intermediate of the ultimate surface active product for it is the structure of the intermediate which determines the properties of the surface active product prepared therefrom, including its biodegradability. Thus, the alkylate intermediate, if an alkylaryl hydrocarbon, may be sulfonated and thereafter neutralized with a suitable alkaline base, such as sodium hydroxide, to form an alkylaryl sulfonate (anionic) type of detergent which is most widely used for household, commercial and industrial purposes. The alkylate intermediate, if an alkylaryl hydrocarbon, is also capable of being converted to a nonionic type of detergent by nitrating the alkylate to form a nuclearly mono-nitrated intermediate which on reduction yields the corresponding alkylarylamine. The amino radical is thereafter reacted with an alkylene oxide or an alkylene epichlorohydrin to form a polyoxyalkylated alkylaryl amine (containing from about 4 to about 30 oxyalkylene units) which is a highly effective detergent. Another large class of detergents based upon the alkylaryl portion of the molecule are the oxyalkylated phenol derivatives in which the alkylphenol base is prepared by alkylation of the phenol nucleus. Still other products having an alkylaryl base are widely known in the art, although alkylaryl sulfonates provide the largest single source of stream pollution and therefore constitute the largest single class of surfactant products which can be synthesized from the straight-chain olefin alkylating agents of this invention. The term: "aryl" as intended herein refers to a monocyclic aromatic nucleus which may be hydrocarbon or may contain various nuclear radicals as substituents, such as hydroxyl, amino, etc.

The source of the alkylating agent to provide the straight chain alkyl group on the aromatic nucleus of the intermediate alkylate is the all-important variable in the process of synthesizing the relatively straight chain alkylate intermediate from which the biodegradable surfactant product is prepared. In order to produce an alkylaryl intermediate, the alkyl group of which is a long chain aliphatic radical containing from 9 to 15 carbon atoms having a relatively straight chain structure, the alkylating agent condensed with the aromatic receptor (aromatic hydrocarbon, phenol, etc.) must have a relatively straight chain structure, since, at best, the alkyl chain attaching to the aromatic nucleus will have a secondary structure, even if a normal, 1-olefin is utilized as the alkylating agent in the condensation reaction with the aromatic reactant. The structure of the resulting secondary alkylate corresponds to the theoretical, predictable mechanism of alkyl transfer which holds that the entering alkyl chain attaches to the aromatic nucleus on the carbon atom of the monoolefin chain having the least number of hydrogen atoms; therefore, even when a 1-olefin is utilized as the alkylating agent, a major proportion of the alkylate intermediate is the isomer corresponding to an aryl-substituted alkane in which the aryl group is attached to an internal carbon atom of the alkyl chain as follows:

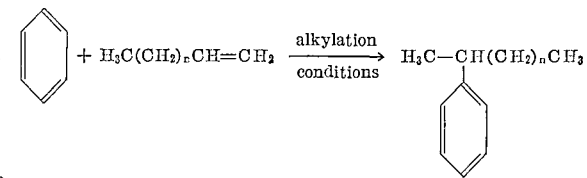

The degree of branching in the alkyl chain of the resulting alkylate intermediate will depend upon the degree of branching in the chain of the olefin utilized as the alkylating agent in the above reaction and therefore, normal 1-olefins, or any other straight chain double bond position isomer, will produce a phenyl-substituted secondary alkane which both of the alkyl chains attached to the secondary carbon atom of the resulting alkylate are straight chain groups.

It has now been found that one of the preferred sources of normal olefins which will yield, upon alkylation, alkylates in which the alkyl portion of the molecule has the maximum degree of linearity and a chain length of from 9 to 15 carbon atoms are normal paraffins present in a kerosene fraction of petroleum, dehydrogenated under controlled conditions to preserve the linearity of the olefinic product. The dehydrogenation of the normal paraffins must be effected at reaction conditions which minimize isomerization of the normal or straight chain 1-olefins produced by dehydrogenation of the paraffins and which yield alkylates in which the alkyl group has maximum linearity.

Any suitable source of normal paraffins, of course, may be utilized for supplying the feed stock to the separation stage of the present process, including an appropriately boiling naphtha fraction of a straight run petroleum distillate, or of the products of the Fischer-Tropsch reaction which includes paraffinic hydrocarbons in the $C_9$–$C_{15}$ range formed by the reductive condensation of carbon monnoxide, the hydrogenated products of ethylene polymerization which includes paraffins having from 9 to about 15 carbon atoms, and the hydrogenated fatty acids which upon complete reduction produce paraffinic hydrocarbons having straight chain configuration. Other sources of paraffinic hydrocarbons of whatever derivation are also contemplated herein as a source of paraffinic feed stock to the present process. The most widely available and generally preferred source of normal paraffins in the $C_9$ to $C_{15}$ range is a naphtha fraction boiling, for example, within the range of from about 150° C. to about 250° C. of kerosene, and more preferably the decane to dodecane fraction thereof boiling from about 170° C. to about 250° C. Most raw material sources of straight chain paraffins, however, are mixtures containing a significant proportion of branched chain isomers in admixture with the desired normal paraffins. These isomers, if converted along with the normal paraffins to their olefin analogs, do not exclusively yield the desired alkylates bearing a straight chain nuclear alkyl substituent or a branched chain alkyl group containing two branches, each of straight chain structure. Consequently, in order to produce alkylate products containing alkyl groups of maximum linearity and the most advantageous properties insofar as its biodegradability is concerned the paraffinic fraction from which the olefin alkylating agent is prepared must be subjected to a suitable separation procedure which isolates the desired normal components from the mixture of paraffin isomers and homologs.

The separation and recovery of normal paraffins from hydrocarbon mixtures containing $C_9$ to $C_{15}$ components having a large number of isomeric configurations must be capable of selectively differentiating the normal isomers not only from the branched chain isoparaffins but also from cyclo paraffins. Separating agents which have the capacity to segregate compounds on the basis of their molecular structure or configuration are referred to "molecular sieves" and certain molecular sieves have sufficient selectivity to provide product streams of 99+ percent normal paraffin purity. One of the preferred molecular sieves of this type is characterized by its chemical composition as a dehydrated metal aluminosilicate having a zeolite structure in the crystals of the aluminosilicate and containing pores of about 5 Angstrom units in cross-sectional diameter which are of sufficient size to permit the entry of normal aliphatic compounds having four or more carbon atoms, but are not of sufficient size to permit the entry of branched chain or cyclic compounds. The metal constituent of these zeolitic compositions is selected from the alkaline earth metals, preferably calcium or magnesium, which are not only the most effective but also the least expensive of the various alkaline earth metal derivatives. These molecular sieve type sorbents are prepared by interaction of silica, alumina, an alkaline base and water to form a zeolite, hydrous alkali metal aluminosilicate which precipitates from its aqueous solution as a mass of finely divided crystals; the recovered alkali metal derivative in the form of the hydrated zeolite is thereafter ion-exchanged with an alkaline earth metal salt and then dehydrated via calcination to form the desired 5 A. molecular sieves containing pores having cross-sectional diameters of about 5 Angstrom units. The preliminary alkali metal salt is prepared by combining water, sodium silicate (as "water glass"), or a silica sol, or an alcohol ester of silicic acid such as ethyl ortho-silicate, a source of alumina or aluminum hydroxide such as an alkali metal aluminate and sodium hydroxide in proportions sufficient to provide the following ratios of reactants, indicated as their oxides:

$Na_2O/SiO_2$ _____ 1.0–3.0
$SiO_2/Al_2O_3$ _____ 0.5–1.3
$H_2O/Na_2O$ _____ 35–200 and heating the aqueous mixture at a temperature of from about 40° C. to about 120° C. for a period up to about 40 hours, or until crystal formation is complete, depending upon the temperature of the reaction. The crystals which precipitate are the sodium form of the metal aluminosilicate and have the following empirical composition:

$$1.0 \pm 0.2 M_2O : Al_2O_3 : 1.85 \pm 0.5 SiO_2 : YH_2O$$

where M is sodium (if the sodium derivatives are involved in the preliminary preparation), although any of the other alkali metals may also be involved in the preparation, and Y has a value up to about 6. The calcium or other alkaline earth metal-exchanger derivatives (having pore diameters of about 5 Angstrom units, which are required in the present process) are conveniently prepared by immersing the initial alkali metal derivative in an aqueous solution of an alkaline earth metal salt, such as a calcium chloride solution. In the resulting ion-exchnge at least a portion of the alkali metal ions in the initial metal derivative are replaced via ion-exchange by the alkaline earth ions present in the aqueous solution. The resulting hydrated crystals of the alkaline earth metal aluminosilicate derivative formed thereby are thereafter dried and calcined at temperatures of from about 150° C. to about 500° C. to dehydrate the water of crystallization from the silicate and thereby develop pores having diameters of about 5 Angstrom units, in which form the product is in its activated form as a molecular sieve for separating normal paraffins from their branched chain and cyclic isomers.

Another class of separating agents which are selective for normal compounds, including olefins if present in the hydrocarbon mixture, is urea which separates these components by the formation of an adduct or clathrate of the urea with the straight chain compound. Thus, urea crystals or an aqueous solution of urea is mixed with the paraffinic or olefinic hydrocarbon mixture at a temperature of from about −10° to about 35° C., the crystalline adduct (or clathrate) forming immediately as the urea is mixed with the hydrocarbon fraction from which the normal components are to be separated. The crystals are filtered from the remaining liquid and thereafter separately decomposed by increasing the temperature of the separated crystals or by displacing the normal hydrocarbon bound to the urea in the form of the clathrate with a preferentially sorbed compound, such as an alcohol, including methanol, ethanol, normal propanol, etc., an aldehyde such as propionaldehyde, acetaldehyde, etc., or other aliphatic compound containing a polar radical.

The straight chain hydrocarbon present in the mixture of hydrocarbon isomers may also be separated from the cyclic and isoparaffinic components present in the hydrocarbon mixture by contacting the mixture with thiourea which selectively forms adducts with the branched chain and cyclic components, leaving the normal hydrocarbons present in the mixture as a raffinate stream which may be withdrawn from the resulting thiourea clathrate. Separation procedures utilizing the above separating agents are well known in the prior art and further reference thereto may be had for specific details of the process technique.

The straight chain aliphatic hydrocarbon separated from the mixture of hydrocarbon isomers boiling in he kerosene range by one of the above-described separation procedures is, in accordance with the present combination process, converted to an olefin alkylating agent by dehydrogenation of the normal paraffins. Dehydrogenation of the straight chain paraffins, recovered from the mixture of aliphatic and/or cyclic hydrocarbons by the above-described separation procedure, to form their monoolefinic analogs is effected by halogenation-dehydrohalogenation methods. Thermal or catalytic dehydrogenation of paraffinic hydrocarbons involves a highly endothermic type of reaction which is conductive to isomerization of the paraffinic hydrocarbons and their olefin dehydrogenation products. The inclusion of a hydrogen acceptor such as chlorine, bromine, iodine and fluorine, in the dehydrogenation reaction mixture radically alters the course of the reaction changing the nature thereof from endothermic to exothermic, thereby obviating, or at least minimizing, isomerization of the paraffinic feed stock and the resulting olefins to their branched chain analogs. Halogenated paraffins and hydrogen halide are formed in the process, the former being readily dehydrohalogenated to form the desired olefins and additional hydrogen halide.

The halogen starting material in the halogenation-dehydrohalogenation process may be recovered from the hydrogen halide formed in consequence of said process by any conventional or otherwise convenient method. One suitable method involves oxidation of the hydrogen halide to reform the halogen and water. Oxidation can be effected in the presence of oxygen, air, or other molecular oxygen-containing gas at a temperature of from about 50° C. to about 400° C. A preferred method comprises admixing air with the hydrogen halide in a mole ratio of from about 5:4 to about 3:2 and heating the same at a temperature of from about 275° C. to about 400° C. in contact with a hydrogen halide oxidation catalyst, preferably a halide or oxide of copper or cerium. The oxidation reaction mixture is suitably contacted with the catalyst at a gaseous hourly space velocity of from about 500 to about 3000.

An alternative oxidation procedure involves utilization of the oxides of certain of the multivalent metals including the oxides of copper, nickel, iron, cobalt, etc., and particularly the oxides of magnesium and zinc. The hydrogen halide is brought into contact with the selected metal oxide at decomposition reaction conditions—generally a temperature of from about 50° C. to about 400° C., forming the metal halide. When the metal oxide has been fully or partially converted to the halide, the hydrogen halide flow is halted and the resulting metal halide is contacted with air at the aforesaid oxidation reaction conditions reforming the metal oxide and releasing the halogen. Chemical equilibrium pertaining to the oxidation reaction wherein combined bromine, such as hydrogen bromide, is oxidized to bromine and water is highly favorable to substantially complete conversion at the comparatively moderate temperature of from about 50° C. to about 400° C. herein employed. Thus, utilization of bromine as a hydrogen acceptor in the dehydrogenation of paraffinic hydrocarbons as herein contemplated is preferred.

The paraffinic hydrocarbon recovered as aforesaid may be monohalogenated at a temperature of from about 0° C. to about 400° C., preferably at a temperature in the upper range, say from about 200° C. to about 400° C. Halogenation is conveniently effected in a continuous manner utilizing either a packed or an unpacked vessel. In the former case the packing may be catalytic material such as copper oxide on alumina, platinum or alumina, etc., or an inert material such as glass chips or beads. The catalytic effect of light on halogenation reactions of the type herein contemplated is of course well known.

The halogenation reaction is effected in an excess of paraffinic hydrocarbon feed stock which may be a molar excess up to about 20 to 1 or more, the excess being recovered for recycle. It is generally preferred to utilize a lesser excess not necessarily exceeding a mole ratio of about 5:1. The halogen and the paraffinic hydrocarbon are maintained in contact at reaction conditions for a relatively short period sufficient to effect substantially complete reaction of the halogen contained in the halogenation reaction mixture. Thus, the flow rate of the halogenation reaction mixture should be maintained at a rate corresponding to a liquid hourly space velocity of from about 1.0 to about 5.0 or more volumes of liquid per volume of catalyst per hour. Although it may be desirable to employ superatomspheric pressures, for example, to maintain the reactants in a liquid state or to facilitate a process flow, pressure is not considered to be an important variable with respect to halogenation and may be simply autogenous pressure developed during the course of the reaction. The excess paraffinic hydrocarbon feed stock is readily separated from the monohalogen derivatives thereof, for example, by distillation methods, and recycled as a portion of the feed to the halogenation process. Alternatively, the monohalogenated product can be treated at the dehydrohalogenation conditions hereinafter described in admixture with the excess paraffinic hydrocarbon and the latter separated from the dehydrohalogenation reaction mixture and recycled to the halogenation process.

Dehydrohalogenation of the monohalogenated paraffinic hydrocarbons to form the desired monoolefin alkylating agent and hydrogen halide is readily effected at a temperature of from about 50° C. to about 400° C. and preferably at a temperature of from about 200° C. to about 400° C., at substantially atmospheric pressure. The dehydrohalogenation process is enhanced by utilization of a suitable dehydrohalogenating agent including calcium chloride, barium chloride, bismuth chloride, calcium sulfate, mercuric chloride, alumina, titania, thoria, magnesia, etc., or metal complexes like ferro-molybdenum, ferro-manganese, ferro-chrome, ferro-aluminum, nickel-aluminum, phosphor-iron, and the like. Dehydrohalogenation proceeds readily at the described conditions at a rate corresponding to a liquid hourly space velocity of from about 1.0 to about 5.0. The monoolefinic product, as well as the paraffinic hydrocarbon feed stock when the same is present, is readily separated from the hydrogen halide formed in the process, for example by simple distillation methods, the monoolefinic product being recovered through a caustic scrubber to remove any entrained hydrogen halide therefrom. In the case where the paraffinic feed stock has not been previously separated, separation of the olefin product therefrom may generally be effected by passing the mixture in a liquid phase through a bed of a suitable adsorbent which selectively retains the normal olefins present in the mixture on the surface of the adsorbent without adsorbing the normal paraffins. Suitable adsorbents of this type include activated silica gel in particle form, activated charcoal (such as coconut shell char), activated alumina (such as calcined bauxite), and others.

Following dehydrogenation of the normal paraffins and the recovery of the n-olefin alkylating agents, the olefin is utilized as an alkylating agent for the aromatic reactant comprising the hydrophobic group in the structure of the present surfactants, selected from the group consisting of benzene, toluene, xylene, ethylbenzene, methylethylbenzene, diethylbenzene, phenol and mononitrosobenzene, yielding a mono-alkylate which is the essential intermediate in the surfactant product of this invention. The alkylation reaction is effected in the presence of a suitable catalyst capable of promoting the condensation reaction, generally an inorganic material characterized as an acid-acting compound which catalyzes the alkyl transfer reaction involved in the process. Acid-acting inorganic compounds having alkylating activity include certain mineral acids, such as sulfuric acid containing not more than about 15 percent by weight of water and preferably less than about 8 percent by weight of water, including used sulfuric acid catalysts recovered from the alkylation of isoparaffins with monoolefins, hydrofluoric acid of at least 83 percent concentration and containing less than about 10 percent by weight of water, liquefied anhydrous hydrogen fluoride, anhydrous aluminum chloride or aluminum bromide, boron trifluoride (preferably utilized in admixture with concentrated hydrofluoric acid), and other acid-acting catalysts. The catalyst particularly preferred for the present alkylation reaction is hydrogen fluoride containing at least 83 percent and more preferably at least 95 percent hydrogen fluoride. Sulfuric acid of at least 85 percent concentration, up to 100 percent, is also a preferred catalyst.

In the process of condensing the aromatic starting material with the n-monoolefin, the hydrogen fluoride, for example, in liquid phase with the aromatic compound is charged into a stirred pressure autoclave, followed by adding the alkylating agent separately to the aromatic reactant and catalyst mixture, the resulting mixture being thereafter maintained, as the stirring continues, at a temperature of from about −20° C. to about 30° C. until alkylation is complete. In order to maximize the production of the desired mono-alkylate from the alkylating agent charged to the process, it is generally preferred that that molar ratio of aromatic compound to alkylating agent be greater than 1:1, and more preferably within the range of from about 2:1 to about 15:1. The reaction effluent is a mixture which is separated to recover the organic portion from the used catalyst, the organic mixture thereafter being distilled to recover the excess aromatic reactant from the residue of alkylaromatic product which remains in the still as a higher boiling residue. In most instances, when the molar proportion of aromatic reactant to monoolefin charged to the process exceeds 1:1 and more desirably from about 5:1 to about 10:1, the monoolefin is more or less completely consumed during the condensation reaction and a mono-alkylate rather than the undesired poly-alkyl-substituted aromatic is obtained as the principal product of the process.

The alkylate prepared in the described manner constitutes the raw material (or starting stock) for the preparation of the ultimate detergent or surface active product. A highly effective detergent is prepared from an alkyl aromatic hydrocarbon by sulfonation producing the sulfonic acid derivative which is preferably neutralized with an alkaline, salt-forming base such as sodium hydroxide to form a water-soluble alkylaryl sulfonate detergent. The alkylate when an alkylaryl hydrocarbon may also be nitrated to form a nuclearly-substituted mononitro derivative which is thereafter catalytically reduced to the mono-amino-substituted analog (e.g., an alkylaniline, an alkyltoluidine, etc.). This amine is thereafter condensed with ethylene oxide or propylene oxide to introduce the hydrophilic poly-(oxyalkylene) group on the amino nitrogen atom, forming thereby the corresponding polyoxyalkylated detergent product which preferably contains from 10 to about 30 oxyalkylene units per molecule of aromatic. In the case of the phenol, the cresol and xylenol alkylates, these are converted directly to detergent products via oxyalkylation with ethylene or propylene oxide (preferably, ethylene oxide) until the product contains from 4 to about 30 oxyalkylene units per molecule of alkylphenol. In the oxyalkylation of both the alkylarylamines and alkylphenols, the condensation is catalyzed by the presence of an alkaline catalyst such as sodium hydroxide in the reaction mixture.

The present invention is further described in the following illustrative examples, which, however, are not presented for the purpose of limiting the scope of the invention, but for purposes of illustrating several embodiments of the present process.

Example 1

In the following comparative preparations, a straight-run petroleum fraction (recovered from a Michigan crude oil), boiling within the range of from about 170° C. to about 225° C. and having the following composition, according to the general classes of the hydrocarbons present:

| | Percent |
|---|---|
| $C_{10}$–$C_{15}$ aliphatic paraffins | 73 |
| $C_9$–$C_{15}$ naphthenes | 24 |
| $C_8$–$C_{15}$ aromatics | 3 | is resolved into the following two classes of components: (1) straight chain or normal paraffins and (2) a mixture of isoparaffinic and cyclic hydrocarbons. The recovered normal paraffins are brominated and thereafter dehydrobrominated to their monoolefin analogs and these are thereafter used to alkylate benzene to form phenyl-substituted normal alkanes. The recovered benzene alkylate is sulfonated, followed by neutralization of the resulting sulfonic acid to the alkylaryl sulfonate salt, a water-soluble, biodegradable or "soft" detergent. This product is then compared (as to detergency and biodegradability) to the corresponding sulfonate salt of the alkylate formed by alkylating benzene with a mixture of branched chain olefins contained in a propylene tetramer fraction boiling from about 170° C. to about 225° C. In each case the alkyl groups in the phenyl-substituted alkanes formed from the dehydrogenated n-paraffins and the propylene tetramer contain the same average number of carbon atoms per alkyl group.

In the first step of the reaction sequence, the normal paraffins in the straight-run fraction are separated therefrom by contacting the mixture with pelleted calcium aluminosilicate molecular sieves (Linde Air Products Company, 5 A. molecular sieves) which selectively sorb the normal paraffinic components of the mixture and leave a non-sorbed raffinate consisting of isoparaffins and the cyclic hydrocarbons present in the fraction. For effecting this separation, the straight-run kerosene fraction is poured at room temperature (25° C.) into a vertical column packed with the molecular sieve pellets; the resulting column is 5 ft. in length and contains 3.8 ft.³ of the pellets, each having a dimension of approximately ⅛″ x ⅛″. A raffinate effluent from the bottom of the column of molecular sieves consists of n-paraffin-free hydrocarbons. The normal paraffin components of the kerosene fraction (about 37% of the total volume of kerosene) remain within the column, sorbed on the molecular sieve particles. The residual raffinate retained on the surface of the pellets is washed from the column by dumping isopentane into the top of the column and draining the wash effluent from the bottom of the column. Any isopentane remaining on the pellet surfaces is seperated from the recovered n-paraffin sorbate product by distillation. Raffinate contained in the wash effluent is recovered as bottoms on distillation of the wash effluent.

After completely draining the column of isopentane wash, the n-paraffins sorbed from the kerosene feed stock are desorbed by filling the column with liquid n-pentane at 25° C., allowing the n-pentane to displace by the mass action effect the kerosene-derived n-paraffins present in the pores of the molecular sieve particles and after 10 minutes the liquid surrounding the sorbent particles is drained into a distillation flask. The column is again filled with n-pentane and after standing for an additional 10 minutes, the liquid in the column is drained into a second distillation flask. Distillation of the n-pentane from the effluent stream in each case left a residue of kerosene n-paraffins (98.5 percent normal components of $C_{11}$–$C_{15}$ chain length) in each flask, 96 percent of the total recovered sorbate being in the first flask.

The $C_9$–$C_{15}$ n-paraffin mixture recovered from the kerosene fraction in the described manner is admixed with bromine in a mole ratio of about 10:1 and charged to the first of three reactors consisting of a ¾″ I.D. vertical steel pipe, 3 feet in length and jacketed with a thermostatically controlled electric heating element. This first reactor is packed with glass beads and maintained at a temperature of about 300° C. The paraffin-bromine mixture is charged to the reactor at a rate corresponding to about 3.5 liquid hourly space velocity. The reactor effluent is cooled and distilled to separate unreacted and/or excess paraffin feed stock for recycle, hydrogen bromine being recovered overhead.

The mono-brominated product recovered as a higher boiling fraction is passed to the second of the described reactors, said reactor containing about 100 cubic centimeters of 20–30 mesh calcium chloride disposed in a fixed bed therein. The mono-brominated product is charged at a liquid hourly space velocity of about 1.2, the reactor temperature being maintained at about 300° C. The reaction mixture withdrawn from the reactor is cooled and distilled to separate the monolefinic product, hydrogen bromide being recovered overhead. The monoolefinic product is recovered through a caustic scrubber and further treated as hereinafter described.

Hydrogen bromide recovered from the bromination step is combined with hydrogen bromide from the dehydrobromination step and charged to the third of the described reactors. Air is charged with the hydrogen bromide in a 3:2 mole ratio therewith. About 100 cubic centimeters of catalyst consisting of 10% copper oxide composited with a zirconia carrier material is disposed in a fixed bed in the reactor. The oxidation reaction mixture is charged to the reactor at a gaseous hourly space velocity of about 1000, and passes in contact with the catalyst at a temperature of about 300° C. The reactor effluent is recovered through a water condenser and bromine recovered from the condensate by distillation. The bromine thus recovered is recycled to the aforesaid bromination step.

The n-olefins recovered by the above procedure are then mixed with 10 molar proportions of benzene, based on the average molecular weight of the olefins as 168 (dodecene) and the hydrocarbon mixture cooled to 0° C. as enough hydrofluoric acid of 98.5 percent concentration is added (with stirring) to provide a weight ratio of acid to olefins of 1.5. The mixture is maintained at a temperature within the range of from 0–10° C. during a period of one hour after which the mixture is allowed to settle and the lower acid layer withdrawn from the upper hydrocarbon layer. The hydrocarbon phase is then washed with dilute caustic to remove dissolved hydrogen fluoride and then distilled to remove excess benzene and a small quantity of aliphatic hydrocarbons boiling in the monoolefin range. The residue, consisting of 96 percent mono-alkyl-benzenes represents an 82 percent by weight yield of alkylate, based upon the olefins charged.

The alkylate product, when subjected to infra-red analysis consists of secondary alkylbenzenes (phenyl-substituted normal alkanes) of the following structure:

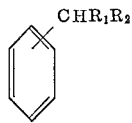

in which $R_1$ and $R_2$ are normal or straight chain alkyl radicals of from 1 to 13 carbon atoms in chain length and in which $R_1+R_2$ is from 9 to 14, a substantial proportion of the product being of the structure in which $R_1$ is methyl and $R_2$ is n-tridecyl.

A second sample of alkylate is prepared by alkylating benzene with a so-called propylene tetramer fraction boiling from about 170° C. to about 225° C. in accordance with the same procedure specified above for the n-olefin alkylate production. Propylene tetramer consists of a mixture of isomers and homologs all of which are of branched chain structure of the following type:

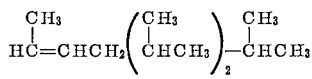

Each of the alkylates prepared as indicated above are sulfonated by mixing the alkylate with an equal volume of liquified n-butane and then with 30 percent oleum which is added to the diluent alkylate mixture as a small stream flowing onto the chilled surface of a rotating cylinder, the surface of the cylinder being cooled by circulating salt water at −10° C. on the inside of the cylinder as the latter is rotated. The sulfonation mixture is scraped from the surface of the cylinder and the mixture re-spread on the cylinder by a stainless steel blade, the n-butane evaporated into a hood as the heat of reaction raises the temperature and boils off the butane, thereby maintaining the temperature at or near the boiling point of n-butane at about 0° C.

The sulfonated reaction mixture removed from the rotating cylinder is diluted by mixing with ice water. The resulting sulfonic and sulfuric acids dissolved in the aqueous solution are neutralized to a pH of 7 with sodium hydroxide and unreacted alkylate (less than 2% by weight of alkylate charged) was extracted from the aqueous solution with ether. Both products are crystalline, cream-colored solids which are completely soluble in water. The evaporated solids are extracted with 70 percent ethanol and the ethanol extract evaporated to dryness to recover sodium sulfate-free products. The product is thereafter mixed with sufficient sodium sulfate builder salt to provide detergent compositions containing a 20–80 weight ratio of sodium alkylaryl sulfonate and sodium sulfate. Each composite product when tested for detergency in a standard Launder-O-Meter test procedure effectively removed a synthetic soil composition from cotton cloth (muslin swatches). The product prepared from the propylene tetramer alkylate is rated as about 98 percent as effective as pure sodium oleate, the product prepared from the n-olefin alkylate is rated at about 102 percent as effective as the standard sodium oleate at equal concentrations. Using distilled water at 160° F. to prepare an 0.3 percent aqueous solution of the alkylaryl sulfonate detergents and the sodium oleate, the detergency of each sample of detergent is measured by determining the reflectance of white light from the cotton muslin swatch samples laundered in each detergent solution separately and thereafter comparing the reflectance therefrom with a sample laundered in the sodium oleate standard solution at the same conditions and at the same concentration of surfactant in solution.

Samples of each of the above detergent preparations are separately subjected to simulated sewage treatment conditions in order to determine the relative rates of removal and the extent of disappearance of each of the samples from a synthetic sewage mixture of known composition. A 0.003 percent aqueous solution of each of the above detergents (100 gallons each) is prepared and to each of the solutions 0.5 lb. of urea (to supply nitrogen nutrient), 0.2 lb. of sodium sulfate (to supply —$SO_4$ nutrient) and trace quantities of zinc, iron, magnesium, manganese, copper, calcium and cobalt are added to provide the necessary nutritional requirements of the bacteria added to each of the solutions. The latter bacteria were supplied in the form of a 1 lb. cake of activated sewage sludge recovered from a sewage treatment plant. The simulated sewage composition, placed in a large, circular tank, is thereafter stirred as air is introduced into the bottom of the tank in the form of fine bubbles through fritted glass nozzles. Approximately 50 cc. samples of the sewage suspension are removed from each of the tanks at three-hour intervals after an initial digestion of 24 hours, filtered, and equal quantities of the filtrate (50 cc.) measured into shaker bottles to determine the height of foam produced after shaking each of the samples of filtrate under similar test conditions. 50 cc. samples of each of the initial, non-digester detergent solutions, shaken for 10 minutes in the test apparatus produced essentially equal volumes of foam (i.e. foam 15 cm. in height). The results of foam height determinations for each of the solutions samples thereafter, an empirical measure of the amount of detergent remaining in solution, are presented in the following Table I for each of the samples and after the indicated periods of bacterial digestion; the foam height is thus an inverse indication of biodegradability of the surfactant sample being tested.

TABLE I.—QUANTITY OF FOAM PRODUCED FROM 50 CC. SAMPLES OF SEWAGE SOLUTION AT VARIOUS INTERVALS OF SEWAGE TREATMENT TIME

| Sample Number | Time of Treatment, Hours | Foam Height, cm. | |
|---|---|---|---|
| | | Propylene Tetramer Alkylate | n-Olefin Alkylate |
| 1 | 0 | 15 | 15 |
| 2 | 24+3 | 15 | 13 |
| 3 | 24+6 | 14 | 12 |
| 4 | 24+9 | 13.5 | 10 |
| 5 | 24+12 | 13 | 8 |
| 6 | 24+15 | 13 | 7 |
| 7 | 24+18 | 12.5 | 6 |
| 8 | 24+24 | 11.5 | 5 |
| 9 | 48+12 | 11 | 4 |
| 10 | 60+12 | 10.5 | 2 |
| 11 | 60+24 | 10 | 1 |

The sample of detergent prepared from the branched chain (tetramer) alkylate remains active (i.e., produced foam) even after 108 hours.

*Example II*

A run similar to the above, utilizing detergent samples prepared by oxyethylating phenol alkylates, containing an average of about 18 oxyethylene units per alkylphenol unit, one sample of which contains a $C_{12}$ alkyl group derived from propylene tetramer and the other sample of which is a $C_{12}$ alkyl group derived from a normal olefin produced by bromination-dehydrobromination of a normal paraffin separated from a straight-run naphtha, utilizing a molecular sieve sorbent, as described in foregoing Example I, further confirms the more rapid biodegradation of surfactants prepared from straight chain alkylating agents, as distinguished from detergents prepared from the propylene tetramer or branched chain alkylating agent.

I claim as my invention:

1. A process for the preparation of an olefinic alkylating agent for use in the production of a biologically soft detergent product comprising an alkylaryl compound in which the aryl nucleus is monocyclic and the alkyl substituent contains from nine to about fifteen carbon atoms, which process comprises separating a straight chain paraffin from a paraffinic naphtha boiling in the range of from about 125° C. to about 250° C. and containing said straight chain paraffin in admixture with branched chain isomers thereof, and converting said straight chain paraffin thus separated from its branched chain isomers to a monoolefin derivative of straight chain structure by a sequence of steps comprising monohalogenating the separated straight chain paraffin at a temperature of from about 0° C. to about 400° C. and dehydrohalogenating the halogenated paraffin at a temperature of from about 50° C. to about 400° C.

2. The process of claim 1 further characterized in that said straight chain paraffin is separated from a paraffinic naphtha boiling in the range of from about 170° C. to about 225° C.

3. The process of claim 1 further characterized in that said straight chain paraffin is separated from said paraffinic naphtha by contacting said naphtha with a porous molecular sieve sorbent in which the pores have cross-sectional diameters of about 5 A. units.

4. A process for the preparation of an olefinic alkylating agent for use in the production of a biologically soft detergent product comprising an alkylaryl compound in which the aryl nucleus is monocyclic and the alkyl substituent contains from nine to about fifteen carbon atoms, which process comprises separating a straight chain paraffin from a paraffinic naphtha boiling in the range of from about 125° C. to about 250° C. and containing said straight chain paraffin in a mixture with branched chain isomers thereof, and converting said straight chain paraffin thus separated from its branched chain isomers to a monoolefin derivative of straight chain structure by the sequence of steps comprising monobrominating the separated straight chain paraffin at a temperature of from about 0° C. to about 400° C. and dehydrobrominating the brominated paraffin at a temperature of from about 50° C. to about 400° C.

5. The process of claim 4 further characterized in that said straight chain paraffin is separated from a paraffinic naphtha boiling in the range of from about 170° C. to about 225° C.

6. The process of claim 4 further characterized in that said straight chain chain paraffin is separated from said paraffinic naphtha by contacting said naphtha with a porous molecular sieve sorbent in which the pores have cross sectional diameters of about 5 A. units.

References Cited by the Examiner
UNITED STATES PATENTS

| | | | |
|---|---|---|---|
| 2,278,719 | 4/1942 | Davis et al. | 260—677 |
| 2,340,654 | 2/1944 | Flett | 260—505 |
| 2,364,782 | 12/1944 | Flett | 260—505 |
| 2,425,535 | 8/1947 | Hibshman | 260—676 |
| 2,463,497 | 3/1949 | Smith et al. | 260—505 |
| 2,490,973 | 12/1949 | Leonard et al. | 260—677 |
| 2,708,210 | 5/1955 | Sias | 260—677 |
| 2,850,535 | 9/1958 | Lane | 260—613 |
| 2,892,877 | 6/1959 | Kolling et al. | 260—677 |
| 2,904,507 | 9/1959 | Jahnig | 260—676 |
| 2,909,574 | 10/1959 | Woodle | 260—676 |
| 2,915,559 | 12/1959 | Horsley et al. | 260—613 |
| 2,974,179 | 3/1961 | Fleck et al. | 260—676 |

OTHER REFERENCES

Hydrocarbon Processing & Petroleum Refiner, vol. 43, No. 3, March 1964, pp. 91–103.

Sawyer et al.: Ind. and Eng. Chem., vol. 48, February 1956, pp. 236–240.

Hammerton: J. Appl. Chem., vol. 5, September 1955, pp. 517–524.

Franz et al.: Petroleum Refiner, vol. 38, No. 4, April 1959, pp. 125–134.

Schwartz et al.: "Surface Active Agents and Detergents," vol. II, 1958, pp. 9, 78–81, 125–127, TP 149 SS.

ALPHONSO D. SULLIVAN, *Primary Examiner.*

LORRAINE A. WEINBERGER, *Examiner.*

B. M. EISEN, *Assistant Examiner.*